(12) United States Patent
Guibert

(10) Patent No.: US 11,029,290 B2
(45) Date of Patent: Jun. 8, 2021

(54) DEVICE AND METHOD FOR THE AUTOMATIC CALCULATION OF A TCG CURVE

(71) Applicant: Airbus SAS, Blagnac (FR)

(72) Inventor: Frank Guibert, Toulouse (FR)

(73) Assignee: AIRBUS SAS, Blagnac (FR)

(*) Notice: Subject to any disclaimer, the term of this patent is extended or adjusted under 35 U.S.C. 154(b) by 316 days.

(21) Appl. No.: 15/777,165

(22) PCT Filed: Nov. 22, 2016

(86) PCT No.: PCT/FR2016/053046
§ 371 (c)(1),
(2) Date: May 17, 2018

(87) PCT Pub. No.: WO2017/089695
PCT Pub. Date: Jun. 1, 2017

(65) Prior Publication Data
US 2018/0328897 A1    Nov. 15, 2018

(30) Foreign Application Priority Data
Nov. 23, 2015  (FR) .................................. 1561218

(51) Int. Cl.
G01N 29/44   (2006.01)
G01N 29/07   (2006.01)
G01N 29/24   (2006.01)
G01N 29/26   (2006.01)

(52) U.S. Cl.
CPC ......... *G01N 29/4463* (2013.01); *G01N 29/07* (2013.01); *G01N 29/2493* (2013.01); *G01N 29/262* (2013.01)

(58) Field of Classification Search
CPC .............. G01N 29/4463; G01N 29/07; G01N 29/2493; G01N 29/262
See application file for complete search history.

(56) References Cited

U.S. PATENT DOCUMENTS

| | | | |
|---|---|---|---|
| 6,439,054 B1* | 8/2002 | Gore | G01N 29/11 73/602 |
| 2004/0100282 A1* | 5/2004 | Christensen | G01B 17/025 324/644 |
| 2015/0316513 A1* | 11/2015 | Grimard | G01N 29/04 702/103 |
| 2017/0234837 A1* | 8/2017 | Hall | G01N 29/2431 73/602 |

FOREIGN PATENT DOCUMENTS

WO    WO 2009141360    * 11/2009

* cited by examiner

*Primary Examiner* — Catherine T. Rastovski
(74) *Attorney, Agent, or Firm* — Greer, Burns & Crain, Ltd.

(57) ABSTRACT

A method for the automatic calculation of a distance-amplitude correction curve for a non-destructive ultrasonic testing system, the system comprising an ultrasound sensor and a reference part. The method comprises the following steps: acquiring a large number of measuring points uniformly distributed over the entire surface of the reference part and classifying, unsupervised, the acquisition points.

11 Claims, 4 Drawing Sheets

DEVICE AND METHOD FOR THE AUTOMATIC CALCULATION OF A TCG CURVE

CROSS-REFERENCES TO RELATED APPLICATIONS

This application claims the benefit of the French patent application No. 1561218 filed on Nov. 23, 2015, the entire disclosures of which are incorporated herein by way of reference.

TECHNICAL FIELD

The present invention pertains to the field of methods of quality control by non-destructive processing. It envisages, more particularly, a method for signal conditioning and processing, and especially for automatically calculating a TCG (Time Compensated Gain) curve in the case of quality control by ultrasound technique.

BACKGROUND OF THE INVENTION

Numerous techniques for the quality control of components by non-destructive processing are known at present.

Among them, one of the techniques consists in dispatching, via an acoustic transducer, an ultrasound beam through a component, the component being, for example, a plate composed of several adjoining thicknesses of composite or metal materials, and in listening to the sound signal returned so as to determine the thickness of the component or discontinuities of its composition.

Indeed, when the ultrasounds emitted by the transducer and passing through the component encounter an interface delimiting two media having different acoustic impedances (resistance of the substance to the passage of sound waves) within the analyzed component, a reflection is generated. The reflected ultrasounds are sensed by a prober (which may be the same as the emitter). An "echo" is created. Likewise, when the signal reaches the lower surface of the component, a return signal is created.

In the case of a component comprising an upper surface on which the transducer is placed and a lower surface, defect detection is done by comparing the time taken to make a return journey in the thickness of the component and the time taken for the reflection on a defect (source: Wikipedia).

In this case, it is usual to represent the result of this measurement by a curve illustrating as ordinate the amplitude of the input, output spikes and the spikes characteristic of detected defects, as a function of time represented as abscissa of the curve. The distance between the spike illustrating the input echo and the spike illustrating the defect echo then makes it possible to determine the depth of each defect or discontinuity in the component.

By making the diagnosis tool (a transducer) traverse a line on the surface of the component to be evaluated, it is also possible to generate a sectional image of the component, highlighting its possible defects, or lines of separation between its constituent thicknesses.

Progressive attenuation of the sound signal occurs naturally when the latter passes through the component, this attenuation being particularly noticeable when the thickness of the components to be analyzed is significant. This attenuation is detrimental to good interpretation of the sound signal recovered at output, especially when the spikes exhibit an amplitude which becomes much the same as measurement background noise. The deep defects in a component then actually become more difficult to detect correctly.

Techniques for correcting this problem have been developed. An adjustment applied during a diagnosis by ultrasound imaging, to take account of the attenuation of the ultrasound signal which passes through the substance, is then designated by the term gain compensation for the flight time (or in English "Time Compensated Gain", acronym TCG). In this adjustment, the gain applied to the received signal is increased in a manner which grows with depth, so as to compensate for the attenuation of the signal. This adjustment of the gain as a function of flight time is complex.

More precisely, when it is necessary to perform the ultrasound inspection of a component, one seeks, during the initial phase of calibration of the measurement system, to obtain the same response (that is to say, the same amplitude of the ultrasound echo, typically 80% of the digitization dynamic range) for an identical reflector, whatever the depth considered, so as to compensate for the intrinsic attenuation of the material.

To that end, according to the current technique, the operator manually fits a variable amplification curve, called TCG (Time Compensated Gain) or DAC (Distance Amplitude Correction), as a function of the digitization time (i.e., of the depth in the component). By using the speed of propagation in the material, one switches from distance to time and it is thus possible to deduce each of the two curves from the other.

This operation is expensive in terms of time and inaccurate since the operator performs several iterations on a limited set of available reflectors (example: tiered component) and fits the curve visually with acquisition software.

An automatic solution exists (called scheme a hereinafter in the document) for calculating the points of a curve of gain compensation for the flight time (TCG) which consists in:

1) Making several acquisitions on a reference component which contains identical reflectors at different depths with no curve of gain compensation for the flight time (TCG) by recording the amplitudes and flight times of the ultrasound echoes generated by the reflectors, 2) Calculating the attenuation for each (time, amplitude) pair and deducing therefrom the compensation gain at each point, 3) Interpolating if necessary between the points.

The TCG/DAC curve thus generated is limited in terms of precision by the number of reflectors of the reference component and requires several ultrasound shots (i.e., acquisitions). This is an automation of the manual procedure mentioned above.

Another solution (called scheme b hereinafter in the document) uses 1/the curve of attenuation as a function of the frequency of the signal in the material, and 2/the spectrum, injected into the component by the sensor, to predict at each depth of the working range the attenuation undergone by the signal. This scheme requires strong a priori knowledge of the injected signal and of the properties of the inspected component and requires that prior acquisitions be carried out by the operator on a standard glass plate reflector.

SUMMARY OF THE INVENTION

An objective of the present invention is to remedy all or some of the drawbacks of the prior art.

The objective of the present invention is, in particular, to provide an automated solution which reduces the adjustment time and to improve the precision (i.e., the quality) of the ultrasound measurements.

To this effect, it envisages firstly a method for automatically calculating a distance-amplitude correction curve, dubbed DAC (Distance Amplitude Correction) curve, for an ultrasound-based non-destructive testing system, the system comprising an ultrasound sensor and a reference component. The method comprises the following steps:

101: acquisition of a large number of measurement points distributed over the surface of the reference component, 102: unsupervised classification (Unsupervised Learning) of the acquisition points ("flight time/amplitude" pairs).

The acquisition points are the "flight time/amplitude" pairs.

For each measurement point, there is acquisition of a "flight time/amplitude" pair.

The inventors propose here a solution based on an approach by unsupervised classification (Unsupervised Learning) of a large number of acquisition points ("flight time/amplitude" pairs) over the whole surface of the reference component mentioned in "scheme a" described above.

The prerequisite to this scheme is therefore the acquisition of a large number of measurement points uniformly distributed over the whole surface of the reference component.

In a particular mode of implementation, the measurement points are uniformly distributed over the whole surface of the reference component.

In a particular mode of implementation, the reference component exhibits various thicknesses. The unsupervised classification step 102 comprises an automatic grouping of the acquisition points group-wise that is "coherent", in the sense of the unsupervised classification grouping (clustering) algorithm chosen, each group corresponding to a thickness of the reference component, the vector used for the grouping (clustering) comprising at least one of the following quantities:

amplitude, flight time, one or more positioning coordinates.

In this particular mode of implementation, one or more of the spatial coordinates of the acquisition points can be used for the clustering so as to take into account the spatial proximity of the points during grouping.

More particularly, in this case, the automatic grouping of the acquisition points group-wise implements an algorithm of K-Means type, with or without heuristic, for determining the number of clusters.

There exist here several alternatives for the choice of the algorithm: K-Means, MeanShift, etc.

In the particular case of the use of the K-Means scheme for the clustering, the number of clusters may either be input directly by the operator, or calculated by one of the following heuristics (non-exhaustive list): silhouette score, gap statistic, elbow method, pham et al., . . . .

In another embodiment, it is possible to compare the number of clusters which is input by the operator with the optimal cluster number proposed by the heuristic, so as to detect possible acquisition problems (if the operator does not scan the component uniformly, for example, and forgets a thickness).

In a particular mode of implementation, the method furthermore comprises:

a step 103 in which, for each group, a generic "flight time, amplitude" pair is determined, and a step 104 of constructing the distance-amplitude correction curve (DAC) by calculating the gain required in order for the value of the amplitude of each group to be equal to a predetermined target value.

The mathematical scheme for determining the position of each chosen generic pair forms part of the following non-limiting list:

Position of the "centroid" arising from the classification,

Occurrence maximum of the histogram,

Gaussian Kernel Density Estimation (KDE),

Fit of a Gaussian kernel,

Mean value,

Median value.

In a particular mode of implementation, in step 103, there is carried out for each group an estimation of the dispersion of the pairs of the group according to the two dimensions flight time and amplitude.

In a particular mode of implementation, in step 104, the values of amplitude and of flight time are reconverted into physical units if the latter have been normalized prior to the classification step.

In a particular mode of implementation, the method is iterative and comprises a step 105 which uses, during the phase of acquisition of the iteration of rank N, the DAC calculated at iteration N−1, the end-of-iteration criterion being effected on the number of clusters (i.e., Groups) found and/or the number of iterations performed.

Alternatively, an iteration is carried out by decreasing or increasing the gain of each DAC point at each iteration until one obtains a sufficiently small variation of the amplitude of the DAC points between two successive iterations according to a previously chosen convergence criterion.

In a particular mode of implementation, in the case of a multielement probe and/or of a multi-shot configuration, the results of all the shots are combined so as to obtain a single distance-amplitude correction curve applied to all the shots.

In a particular mode of implementation, in the case of a multielement probe and/or of a multi-shot configuration, an independent DAC curve is calculated for each shot.

It is understood that, initially, the unsupervised classification makes it possible to automatically group together the acquisition points group-wise, each group corresponding to a thickness of the reference component.

Subsequently, for each group, a statistical processing (which may comprise but not limitingly: mean value, fit of a Gaussian kernel, histogram, kernel density estimation . . . ) makes it possible to determine the value of the gain and of the time which give the desired correction.

An evaluation of the dispersion of the data of each group also makes it possible to apprise the operator regarding the uniformity of the response of the reference component.

BRIEF DESCRIPTION OF THE DRAWINGS

The characteristics and advantages of the invention will be better appreciated by virtue of the description which follows, which description discloses the characteristics of the invention through a nonlimiting exemplary application.

The description is supported by the appended figures which represent.

DETAILED DESCRIPTION OF THE PREFERRED EMBODIMENTS

Figure 1:
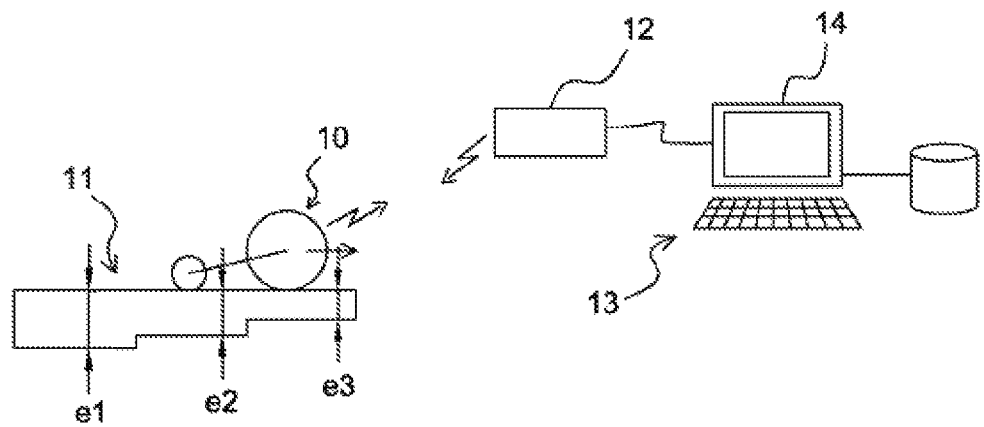
FIG. 1: a schematic representation of the diverse elements of a system implementing a method according to the invention.

As seen in FIG. 1, the system firstly implements an ultrasound sensor 10. The sensor 10 is here but not limitingly of multielement type ("phased-array") with a wheel. In the present example, this wheel is one containing a multielement sensor of thirty-two elements.

The ultrasound sensor 10 may alternatively be of monoelement type. The sensor 10 is manipulated by hand or with an encoded mechanical arm or with any encoding device (the latter may also be electromagnetic). Such a sensor 10 is of a type assumed to be known per se.

The system secondly implements a reference component 11. The latter is a component whose geometry, and especially thickness, is perfectly known at all points of a measurement zone.

Preferably, the reference component 11 exhibits several thicknesses.

This reference component 11 is here of substantially plane type (one dimension is small with respect to the other two), one of whose surfaces is plane, and which exhibits facing this plane surface several zones of different thicknesses, parallel to one another, disposed in staircase fashion. In the present example, the reference component 11 exhibits three thicknesses e1, e2, e3 tiered five millimeters by five millimeters. The reference component 11 is thus a plate of dimension about fifteen centimeters in width (direction along which the thickness is fixed) and forty centimeters in length (direction along which the thickness varies in staircase fashion), comprising three zones. In the present example, the reference component 11 is made of metallic material.

The system thirdly implements a measurement acquisition card 12, itself linked to means for storing data and for calculation 13, here of PC computer type, suitable for executing a method in software form on the data gathered by the sensor and inputs of a user. These calculation means 13 are associated here with a display screen 14.

Mode of Operation

Figure 2:
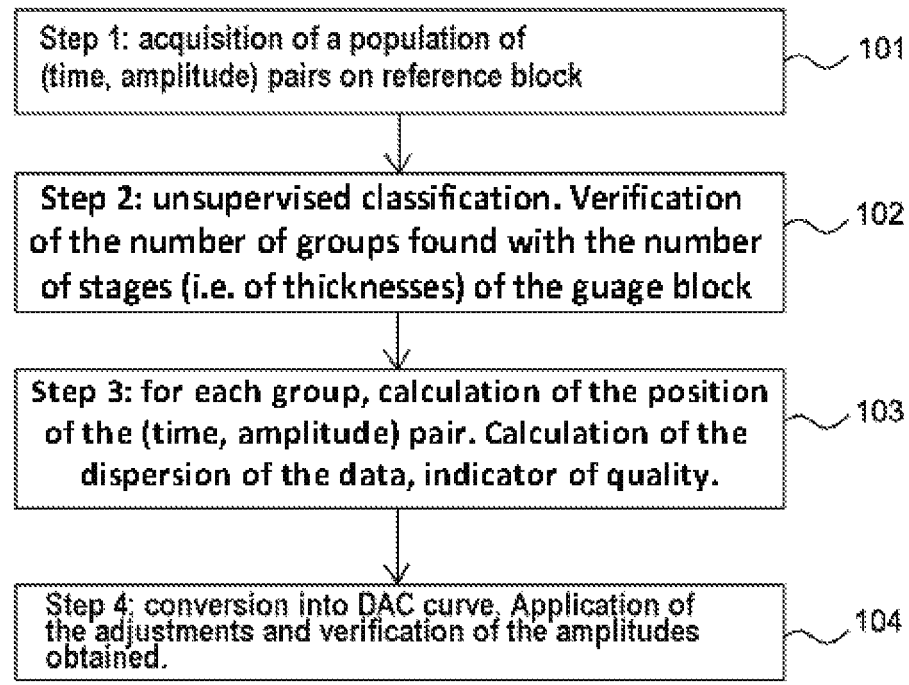
FIG. 2: a flowchart of the steps of the method according to a first mode of implementation of the invention.

FIG. 2 represents a flowchart of the steps of the method according to the invention, in a first wholly non-limiting embodiment. As seen in this figure, the method comprises several steps.

The first step 101 comprises acquiring a set of background echo "amplitude/flight time" pairs for a set of points by displacing the ultrasound sensor 10 over the reference component. In the present exemplary embodiment, these points are uniformly distributed over the whole surface of the reference component 11. By this is meant that these measurement points are not mainly concentrated over a zone of small area in regard to the total area of the component, but comprise measurement points equitably distributed in each of the zones of different thickness of the component. They are acquired here by displacing the sensor longitudinally along the component according to several laterally spaced paths. In the present case, several tens of paths are carried out, corresponding to several hundred measurement acquisition points.

The second step 102 comprises executing on the set of amplitude/flight time (time for the sound wave to make a return trip) data acquired for the various measurement points an unsupervised classification algorithm (for example, but not limitingly, of KMeans, Affinity Propagation, etc. type) so as to separate the various populations (i.e., groups) of measurement points corresponding to the various thicknesses e1, e2, e3 of the reference component 11.

This classification may be done either on one variable (the flight time) or on the two variables (flight time and amplitude), or on the two variables flight time and amplitude and one or more positioning variables. It is noted that working on two variables, time and amplitude, makes it possible to use the k-means centroids directly for the DAC curve. The fact that, in addition, the positions (x, y . . . ) are used makes it possible to favor the grouping of the points that are close together in space.

Figure 3:
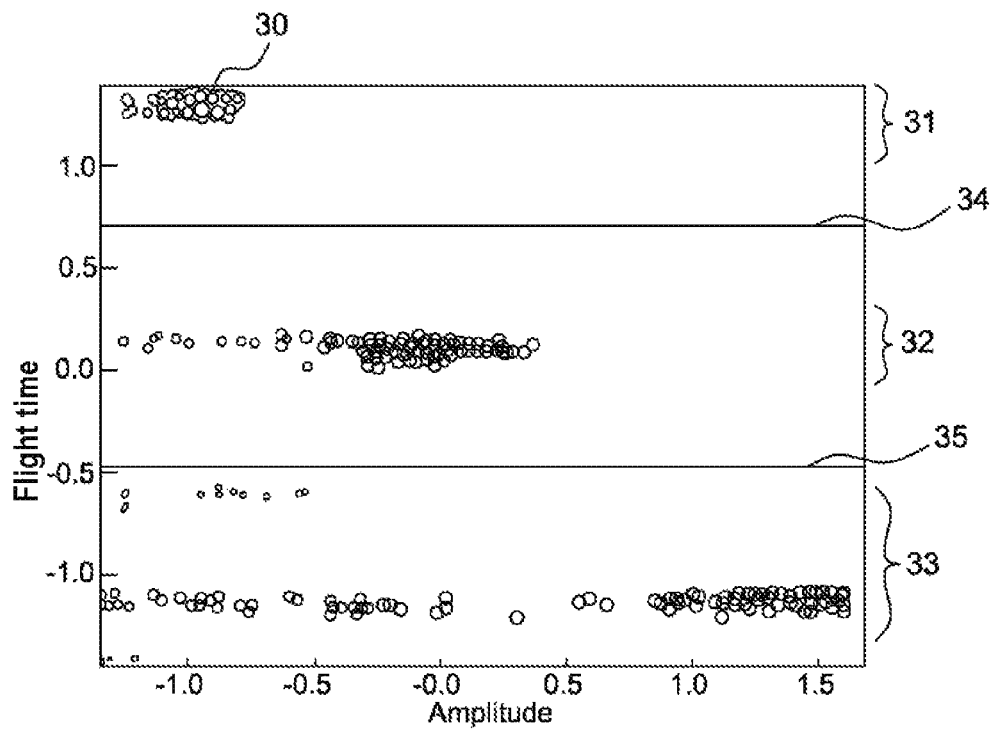
FIG. 3: a graph illustrating an exemplary automatic classification in one dimension ("flight time"), with a K-Means algorithm.

FIG. 3 gives an exemplary classification using an algorithm of K-Means type for a reference component 11 exhibiting three thicknesses, using the flight time alone. The K-Means algorithm is an algorithm for partitioning data into sub-groups, in such a way as to minimize a predetermined criterion.

FIG. 3 shows a set of points distributed over two dimensions whose horizontal dimension represents the amplitude, and whose vertical dimension represents the flight time, related directly to the thickness of the component. The amplitude of the received signal varies according to the points, and the maximum amplitude varies according to the groups of points. It is found that the shorter the flight time (points situated toward the bottom of the figure), the larger the amplitude (points situated more toward the right of the figure).

As seen in this figure, the points 30 group together intuitively into three main groups 31, 32, 33 according to the flight time.

The K-Means algorithm used in the present exemplary implementation of the method leads to this partition into three groups. The K-means algorithm produces centroids. It is then possible to separate any point in space by assigning it to the centroid to which it is closest. It is this that makes it possible to plot the separation lines visible in FIG. 3. The lines represent the boundaries between two groups (clusters).

These three groups of points therefore make it possible to determine that the component exhibits three thicknesses of materials.

In a step 103, for each group, a generic "flight time, amplitude" pair 41, 42, 43 is determined (see FIG. 4), whose position is determined by a mathematical scheme forming for example part of the following nonlimiting list:

Position of the "centroid" arising from the classification,
Occurrence maximum of the histogram,
Gaussian Kernel Density Estimation (KDE),
Fit of a Gaussian kernel,
Mean value,
Median value.

Figure 4:
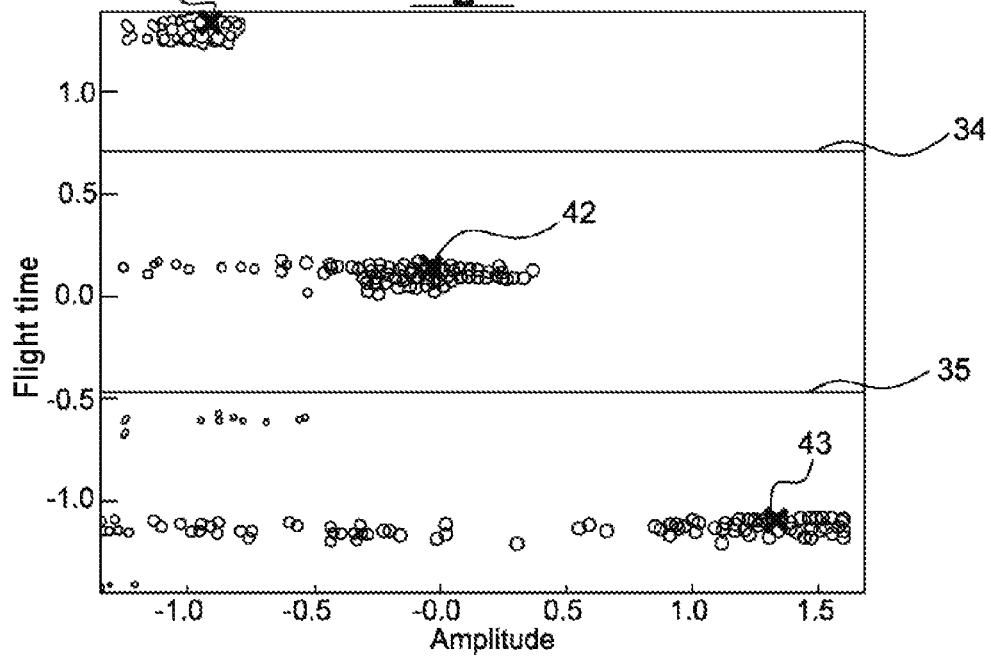
FIG. 4: a graph illustrating the result of the calculation of the position (amplitude, time) for each group, here Gaussian Kernel Density Estimation.

FIG. 4 illustrates this step, in the particular but nonlimiting case of the use of the KDE (Kernel Density Estimation)

scheme and a kernel of Gaussian type. These schemes are assumed known to the person of the art, and are therefore not discussed in detail here. In a very simplified marnier, it is assumed, in the present exemplary implementation, that the successive points which have been acquired, for a group of points (31 for example), are representative of a Gaussian distribution, and the pair (here 41) corresponding to the peak of the Gaussian function is for example determined.

In the present exemplary implementation of the method, in this same step 103, there is carried out for each group an estimation of the dispersion of the pairs of the group according to the two dimensions flight time and amplitude. This estimation makes it possible to produce an indicator of the quality of the distance-amplitude correction curve (DAC: Distance Amplitude Correction) obtained hereinafter (and of the heterogeneity of the response of the reference component 11). This complementary step of dispersion estimation is optional. The standard deviation within each cluster is, for example, calculated and an alert is raised for the operator if the standard deviation is not less than a fixed threshold.

The last step 104 comprises constructing a distance-amplitude correction curve (DAC) by calculating the gain required in order for the value of the amplitude of each group 31, 32, 33, denoted amplitude_of the_group, to be equal to a predetermined target value denoted amplitude_target. It should be noted that the values of amplitude and of flight time are reconverted into physical units if the latter have been standardized prior to the classification step. For the flight time, use is made of the flight time associated with the group, this flight time being denoted time_of the_group.

We therefore have:

$$\text{Gain} = 20*\text{Log}(\text{amplitude\_target}/\text{amplitude\_of the\_group})$$

$$\text{Time} = \text{time\_of the\_group}$$

The DAC curve thus created is a curve formed of straight segments linking the "time, gain" pairs corresponding to each group.

Figure 5:
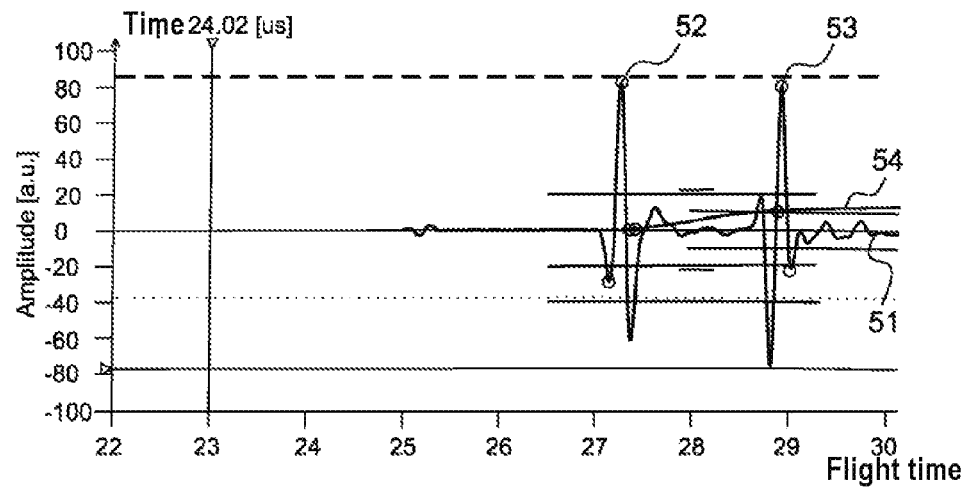
FIG. 5: a graph illustrating the normalized response of the first echo (of the first thickness) after application of the DAC by classification (composite material, multielement probe)
Figure 6:
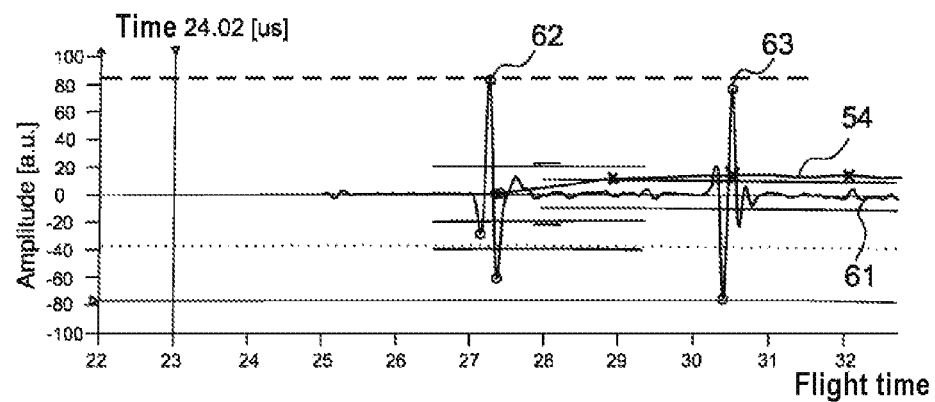
FIG. 6: a graph illustrating the normalized response of the second echo (of the second thickness) after application of the DAC by classification (composite material, multielement probe)

FIGS. 5 and 6 illustrate the use of a DAC curve thus obtained and the amplitude normalization of the signal. FIG. 5 comprises as horizontal axis the flight time, and as vertical axis the amplitude. It illustrates the sound signal received as output of the sensor at a measurement point, after correction (by multiplication) by a distance-amplitude correction curve 54. The distance-amplitude correction curve 54 illustrated here has been created as described above. FIG. 5 shows the normalized response of the first echo (of the first thickness) after application of the DAC by classification, here in the composite material, multielement probe case. FIG. 6 shows likewise the normalized response of the second echo (of the second thickness) after application of the DAC by classification.

As seen in these figures, the signal curve 51 thus corrected exhibits two sharply visible spikes (52, 53 in FIG. 5, 62, 63 in FIG. 6), corresponding to the respective echoes of the upper face and of the lower face of the reference component 11. In accordance with the objective, the amplitudes observed for the spikes 53, 63 are equivalent, and equal to 80%, chosen here as target amplitude.

It is noted that, by construction, the flight times of the DAC points thus generated coincide with the flight times of the spikes 52, 53, 62, 63. This validates that the DAC points have indeed been aligned with the echoes reflected on each of the thicknesses and "reassures" the operator who previously had the habit of adjusting everything manually: he can then visually apprehend what the algorithm has done.

Figure 7:
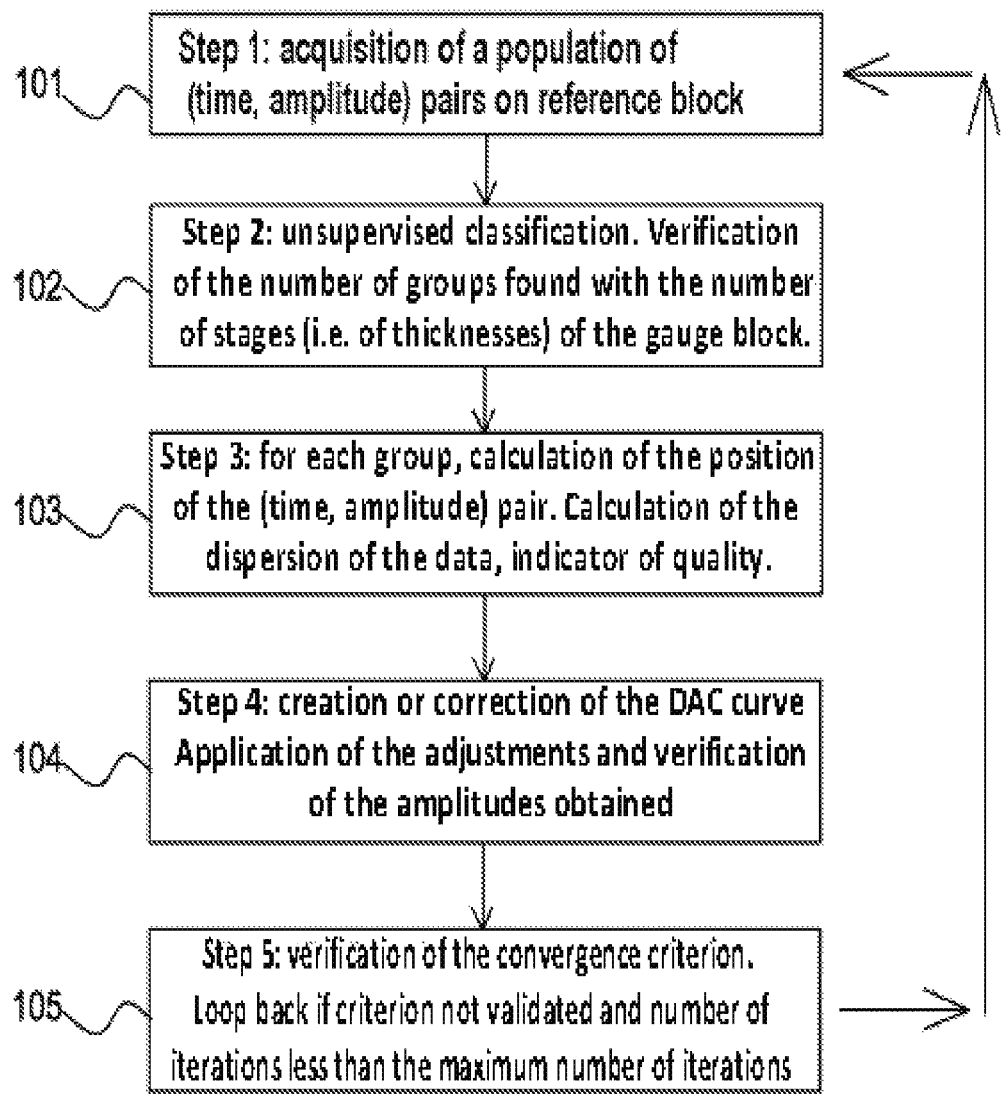
FIG. 7: a flowchart of the steps of the method according to a second mode of implementation of the invention.

An alternative version of the algorithm (see FIG. 7) proposes to iterate by repeating the acquisition phase at iteration N by using the DAC calculated at iteration N−1 with a stopping criterion on the number of clusters (i.e., Groups) found and/or the number of iterations.

This is particularly useful in the case of a multi-thickness reference component for which the last thicknesses (the largest ones) are so thick that the useful signal does not cross the threshold of detection of the gate during the first iteration. By using an iterative scheme and by assuming that the gain of the last thickness detected at iteration N−1 is propagated until the end of the signal acquired at iteration N by a constant DAC segment, the signal of the largest thicknesses will thus, gradually, be made to emerge from the noise.

Another alternative version of the algorithm proposes to iterate by decreasing or increasing the gain of each DAC point at each iteration until one obtains a sufficiently small variation of the amplitude of the DAC points between two successive iterations (convergence criterion). This scheme will make it possible, in particular, to drive the systems whose gain controller is inexact (large disparity between setpoint and observed value).

In the case of a multielement probe and/or of a multi-shot configuration, it is possible by choice to combine the results of all the shots so as to obtain a single DAC curve applied to all the shots or else to perform the processing per shot so as to obtain a DAC curve per shot. In the case of a multielement probe, it is possible to have several shots at the same time or successively, corresponding to an active subset of the elements. A shot can thus be viewed as a measurement point 30 on the component.

Advantages

This method exhibits the following advantages:

It is very easy to implement and completely automatic.

It is more accurate than "scheme a" since it uses a large number of points for each thickness of the reference reflector. It makes it possible to evaluate the uniformity of the reference reflector and to detect possible anomalies, if any.

It is more robust than scheme "a" since it is entirely automated, thereby making it possible to limit the approximations related to the human factor. Saturation of the signal or poor distribution of the points on the component can thus be readily detected by analyzing respectively the maximum amplitude of the recorded signals and the distribution of the coder data, if the latter are available.

It is simpler to implement than "scheme b" since it does not require any a priori knowledge (and therefore any experimentation and/or measurement) of the material properties of the inspected component or of the frequency content of the sensor.

It is applicable directly as post-processing of existing acquisitions carried out before the fine-tuning of the method.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatically calculating a distance - amplitude correction curve for an ultrasound-based non-destructive testing system used to determine the thickness of a component or discontinuities of its composition, the system comprising an ultrasound sensor and a reference component, the method comprising:
   acquiring "flight time / amplitude" pairs, termed acquisition points, for a large number of measurement points distributed over a surface of the reference component,
   classifying, unsupervised, the acquisition points, wherein this step comprises an automatic grouping of the acquisition points group-wise, each group corresponding to a thickness of the reference component,
   determining, for each group, a generic "flight time, amplitude" pair, and
   constructing the distance - amplitude correction curve by calculating a gain required in order for a value of an amplitude of each group to be equal to a predetermined target value.

2. The method as claimed in claim 1, in which the measurement points are uniformly distributed over a whole surface of the reference component.

3. The method as claimed in claim 1, in which a vector used for the grouping comprising at least one of the following quantities:
   amplitude,
   flight time,
   one or more positioning coordinates.

4. The method as claimed in claim 3, in which the automatic grouping of the acquisition points group-wise implements an algorithm of K-Means type.

5. The method as claimed in claim 1, in which a mathematical scheme for determining a position of each chosen generic pair forms part of the following nonlimiting list:
   position of a "centroid" arising from the classification,
   occurrence maximum of a histogram,
   Gaussian Kernel Density Estimation,
   fit of a Gaussian kernel,
   mean value,
   median value.

6. The method as claimed in claim 1, in which, in the determining step, there is carried out for each group an estimation of a dispersion of the pairs of the group according to the two dimensions flight time and amplitude.

7. The method as claimed in claim 1, in which, in the constructing step, the values of amplitude and of flight time are reconverted into physical units if the latter have been normalized prior to the classification step.

8. The method as claimed in claim 1, furthermore comprising a step in which there is carried out an iteration which uses, during a phase of acquisition of an iteration of rank N, the distance - amplitude correction calculated at iteration N-1, end-of-iteration criterion being affected on at least one of a number of clusters found or a number of iterations performed.

9. The method as claimed in claim 1, in which, in the case of an ultrasound sensor, results of all shots are combined so as to obtain a single curve of distance - amplitude correction applied to all the shots of the ultrasound sensor.

10. The method as claimed in claim 1, in which, in the case of ultrasound sensors, an independent distance - amplitude correction curve is calculated for each shot.

11. A method for automatically calculating a distance - amplitude correction curve for an ultrasound-based non-destructive testing system used to determine the thickness of a component or discontinuities of its composition, the system comprising an ultrasound sensor and a reference component, the method comprising:
   acquiring "flight time / amplitude" pairs, termed acquisition points, for a large number of measurement points distributed over a surface of the reference component,
   classifying, unsupervised, the acquisition points, wherein this step comprises an automatic grouping of the acquisition points group-wise, each group corresponding to a thickness of the reference component;
   determining, for each group, a generic "flight time, amplitude" pair, and
   constructing the distance - amplitude correction curve by calculating a gain required in order for a value of an amplitude of each group to be equal to a predetermined target value, and
   furthermore comprising a step in which an iteration is carried out by decreasing or increasing a gain of each point of the distance - amplitude correction curve at each iteration until one obtains a sufficiently small variation of the amplitude of the points of the distance - amplitude correction curve between two successive iterations according to a previously chosen convergence criterion.

* * * * *